US006239849B1

(12) United States Patent
Cho

(10) Patent No.: US 6,239,849 B1
(45) Date of Patent: May 29, 2001

(54) ELECTROMAGNETIC WAVE SHIELD USABLE WITH A DISPLAY DEVICE

(75) Inventor: Nam Il Cho, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/034,392

(22) Filed: Mar. 4, 1998

(30) Foreign Application Priority Data

Mar. 5, 1997 (KR) .................................................. 97-3779

(51) Int. Cl.[7] ...................................................... H04N 5/64

(52) U.S. Cl. ............................................ 348/836; 348/839

(58) Field of Search .................................... 348/836, 839, 348/843, 787, 794; 312/7.2, 223.1, 223.2, 223.6; 220/2.3 A, 2.1 A; 174/51, 35 R, 35 TS; 248/74.1; 361/816, 818, 800, 826, 827

(56) References Cited

U.S. PATENT DOCUMENTS 4,853,790 * 8/1989 Dickie ............................. 348/836 X
4,858,016 * 8/1989 Suehiro et al. ................... 220/2.1 A
5,349,132 * 9/1994 Miller et al. ....................... 174/35 R
5,351,920 * 10/1994 Decky et al. ................... 248/74.1 X
5,510,827 * 4/1996 Kubota et al. ....................... 347/257
5,793,494 * 8/1998 Douken et al. ...................... 358/254
5,806,940 * 9/1998 Heirich ............................ 348/836 X

* cited by examiner

*Primary Examiner*—Janet M. Wilkens
(74) *Attorney, Agent, or Firm*—Robert E. Bushnell, Esq.

(57) ABSTRACT

An integrated plastic shield for shielding the electromagnetic waves of a cathode ray tube in monitors is disclosed. The shield is formed of a conductive or nonconductive plastic material into a single structure through an injection molding process, with a plurality of elastic ground terminals for grounding both the band and the funnel of the cathode ray tube being integrated with the single body through the molding process. A degaussing coil fixing member is integrated with the shield's internal surface. When the shield is formed of a nonconductive plastic material, the shield has to be coated or plated with a conductive material on its surface. The shield is free from any sharpened edge thus being free from causing any damage or injury to the covered degaussing coil or to the body of a worker while the shield is set in a monitor.

23 Claims, 5 Drawing Sheets

ELECTROMAGNETIC WAVE SHIELD USABLE WITH A DISPLAY DEVICE

CLAIM OF PRIORITY

This application makes reference to, incorporates the same herein, and claims all benefits accruing under 35 U.S.C. §119 from an application entitled Electromagnetic Wave Shield and Monitor with Such a Shield earlier filed in the Korean Industrial Property Office on Mar. 5, 1997, and there duly assigned Serial No. 1997/3779 by that Office.

BACKGROUND OF THE INVENTION

1. Field of the Invention

The present invention relates to an electromagnetic wave shield and, more particularly, to an integrated plastic shield suitable for shielding the electromagnetic waves of a cathode ray tube usable with a display device.

2. Background Art

The recent trend of enlarging monitors and improving the resolution of monitors has resulted in the generation of a large amount of electromagnetic waves by the cathode ray tubes used in the newer monitors. Such electromagnetic waves sometimes cause interference in electronic equipment around the monitor, thus causing operational errors in nearby electronic equipment. Additionally, electromagnetic waves from the cathode ray tube can be injurious to one's health, thus the amount of electromagnetic waves discharged into the atmosphere should be kept to a minimum level. In order to limit the amount of discharged electromagnetic waves, various types of shields may be used with monitors.

An electromagnetic shield is comprised of highly conductive metal sheets that are formed through a pressing process prior to being integrated into a predetermined configuration through a fastening process. That is, 15 to 30 metal sheets have to be assembled into a shield using a plurality of fasteners, thus complicating the production process of the shield. In addition, the elements of the typical shield are formed of 3 to 5 different kinds of materials. This handling of various components of various materials reduces production efficiency due to a more complicated assembling process to combine the necessary elements into a shield. When a monitor is being assembled, it is necessary to first connect a degaussing coil to the shield prior to mounting the shield onto the cathode ray tube. This further reduces the manufacturing productivity during the production process of monitors. The degaussing coils are connected to the shield to prevent the reduction of image quality due to the electromagnetic waves of the cathode ray tube. Terminals are located on the cathode ray tube to ground the shield, but they are also problematic because the terminals increase the number of different materials used with the shield and reduce the grounding effect of the shield due to non ideal contact between the terminals and the cathode ray tube. High voltage current flows through the degaussing coil that may be connected to the shield using fixing members integrated with the metal sheets or by using separate cable ties. The electromagnetic shield may be constructed of metal sheets giving the shield many sharpened edges that may cause unexpected damage to the covered coils. When the covered coils are unexpectedly damaged by the sharpened edges of the shield, they may short circuit and cause serious damage to the monitor.

Contemporary electromagnetic shields are time consuming to assemble, involve various components, can cause gouges in the tape used to cover degaussing coils, and are not easily recyclable due to the multitude of different materials used in the constructing an electromagnetic shield. I believe that it may be possible to improve the current art by providing an electromagnetic wave shield that is formed of a single structure, that has a simpler assembly process, that does not generate noise when the cathode ray tube is magnetized by a degaussing coil, that does not have any sharp edges, that has improved durability, that increases the efficiency of production, that can be produced more economically, that is conveniently recyclable, and that is suitable for use in monitors.

SUMMARY OF THE INVENTION

Accordingly, it as an object of the present invention to provide an electromagnetic wave shield for monitors, that is formed into a single structure that is free from requiring any additional assembling process thus improving manufacturing efficiency while assembling monitors and improving the manufacturing productivity for the monitors.

It is another object to provide an electromagnetic wave shield for monitors, that is formed of conductive plastic without having any sharpened edges thus to prevent causing any damage to the elements around the shield, stabilizing the operation of a monitor, improving durability of the monitor, and effectively almost completely grounding the cathode ray tube.

It is still another object to provide an electromagnetic wave shield that is conveniently recyclable.

It is yet another object to provide an electromagnetic wave shield for monitors, that does not generate any irritating operational noise when the cathode ray tube is magnetized by a degaussing coil.

It is a further object to provide a monitor that uses the electromagnetic wave shield of the present invention.

To achieve these and other objects, an electromagnetic wave shield for monitors may be constructed using resin in combination with a plurality of elastic ground terminals for grounding both the band and the funnel of a cathode ray tube that is integrated with the shield during the molding process.

The present invention also provides a monitor with a cathode ray tube that may be constructed using a front cover; a rear cover assembled with the front cover into a monitor casing containing a cathode ray tube; and an electromagnetic wave shield mounted in the monitor casing to shield the electromagnetic waves of the cathode ray tube. The shield may be integrated using an ear mount to allow each ear of the cathode ray tube to be mounted to the front cover with the ear mount being interposed between each ear and the front cover; an electromagnetic wave shielding part covering a funnel of the cathode ray tube; a plurality of elastic ground terminals coming into elastic contact with both band and funnel of the cathode ray tube, thus grounding the band and funnel; and a high voltage wire inlet opening allowing a high voltage wire to pass through the covers prior to being connected to an anode of the cathode ray tube.

In another embodiment of this invention, the electromagnetic wave shield may be integrally formed of nonconductive resin through a molding process prior to being coated or plated with a conductive material on its surface.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE DRAWINGS

Figure 1:
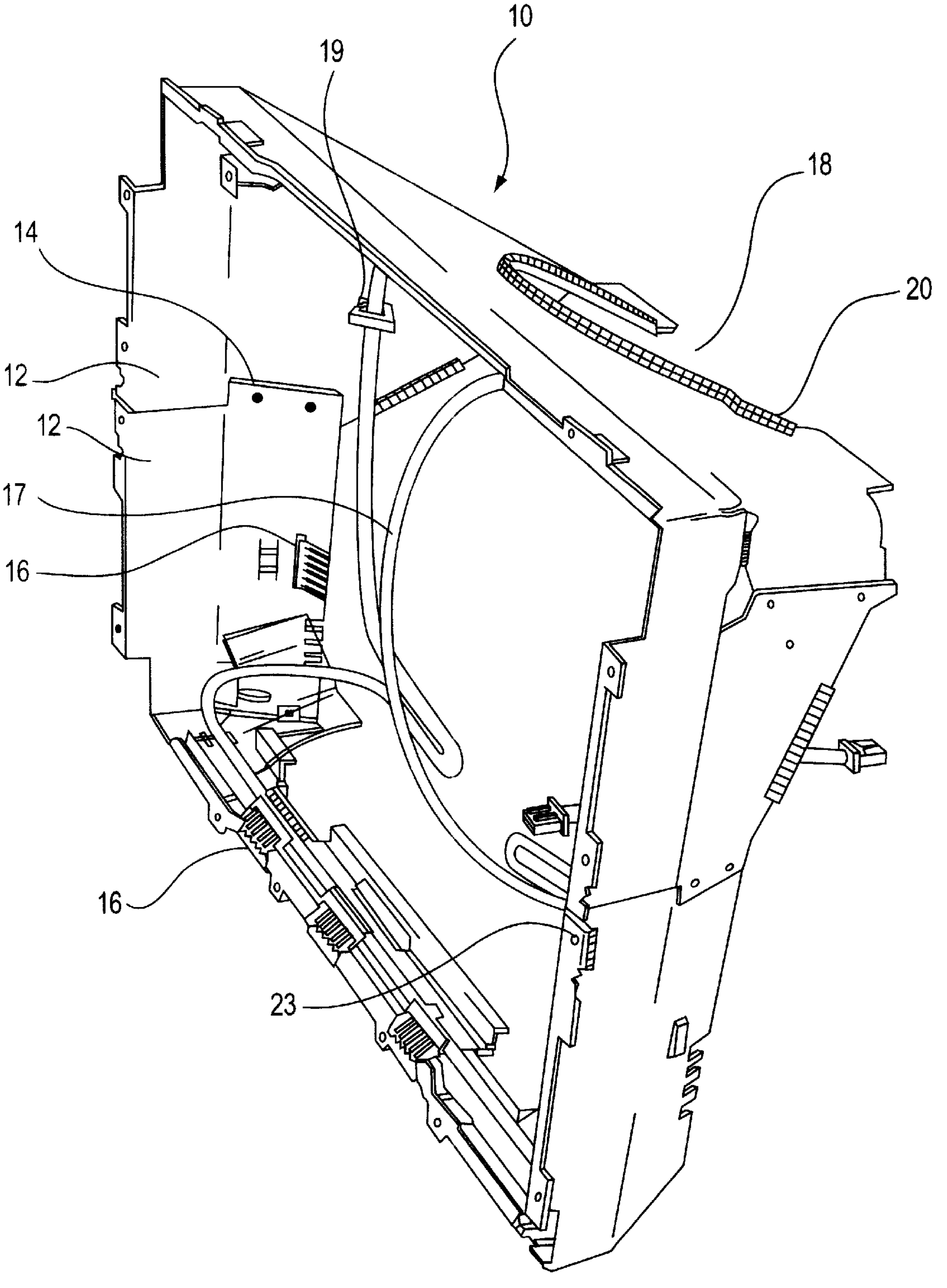
FIG. 1 is a perspective view of an electromagnetic wave shield for monitors.
Figure 2:
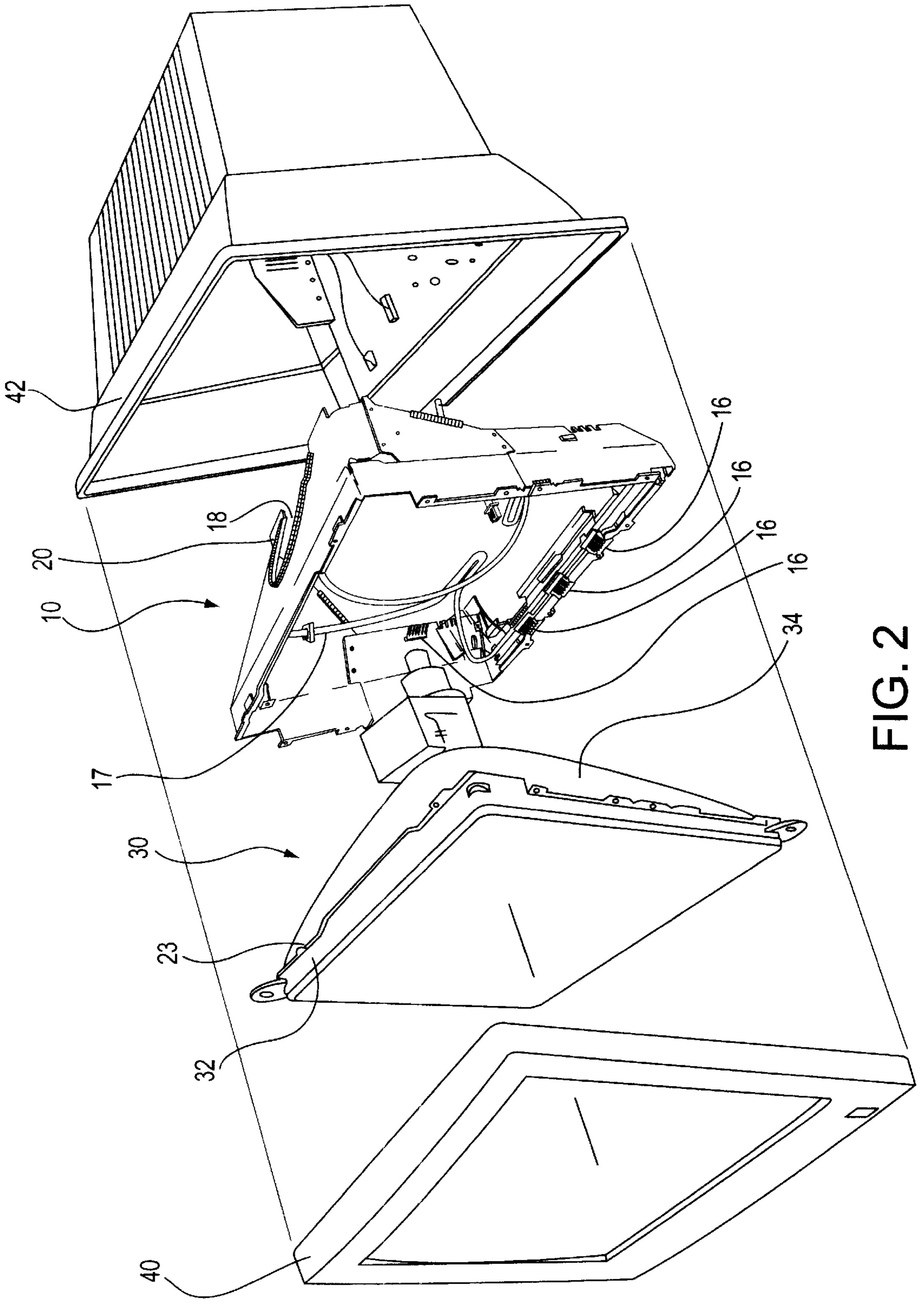
FIG. 2 is an exploded perspective view of a monitor with an electromagnetic shield.

Turning now to the drawings, FIGS. 1 and 2 show the construction and configuration of an electromagnetic wave shield for monitors. Shield 10 is comprised of highly conductive metal sheets 12 that are formed through a pressing process and integrated into a predetermined configuration using fasteners 14. Ground terminals 16 are used as a grounding means and are on shield 10. Ground terminals 16 come into contact with both metal band 32 and conductive material-coated funnel 34 of the cathode ray tube, thus grounding both band 32 and funnel 34. An example of a possible conductive material that may be coated on funnel 34 is graphite. High voltage wire inlet opening 18 is formed on the top wall of shield 10 and allows a high voltage wire (not shown) to pass through prior to being connected to the anode of the cathode ray tube. The high voltage wire supplies a high voltage to the cathode ray tube. To insulate the shield 10 from the high voltage wire, the edge of opening 18 is covered with an insulating liner 20.

Shield 10 has to be provided with some conductivity and also have a grounding means 16. Thus, shield 10 may be formed of a metal through a pressing process. It is preferable to produce shield 10 using an elastic metal to effectively prevent grounding means 16 of shield 10 from being unexpectedly separated from the cathode ray tube. In addition, it may be necessary to enlarge the grounding area of shield 10 to provide a highly conductive shield with an enlarged grounding area. This could be accomplished by assembling separately produced metal sheets 12 into a single structure.

Degaussing coils 17 are typically covered through a taping process, resulting in tape that is wound around and covers each coil 17 while maintaining tension. Tape-covered coils 17 may be finely scratched by the sharpened edges of shield 10 when they are connected to the shield 10. The finely scratched tape of coil 17 may not cause any immediate short circuit of coil 17, but the scratch will likely gradually widened since the tape covers coil 17 while maintaining tension as described above. The widened gap in covered coil 17 causes the coil to be exposed to the atmosphere and may lead to a short circuit. To prevent the sharpened edges of shield 10 from scratching covered coils 17, each of the sharpened edges may be covered with a plastic sheet. However, the covering of the sharpened edges with plastic sheets is inconvenient for the manufacturers of the monitors. That is, each sharpened edge of shield 10 has to be covered with a plastic cover prior to being securely tightened together with covered coils 17 using a plurality of tightening members. This remarkably reduces the productivity of manufacturing monitors. Degaussing coil 17 is secured to shield 10 by a latching member 19. Metal sheets 12 are assembled into shield 10 through a fastening process so that the contact area at each junction between sheets 12 is limited. Thus reducing the grounding effect of the shield and failing to accomplish producing a uniform quality of monitors. In order to assemble shield 10 with the cathode ray tube, shield 10 has fastener holes 23 that are screwed to the cathode ray tube's band 32 via shield mounting holes 33. However, the fastening process of attaching shield 10 to the cathode ray tube lengthens the assembling time of the monitor. The grounding means of shield 10 uses a plurality of grounding terminals 16, that are separately formed of an elastic metal prior to being mounted to shield 10.

Figure 3:
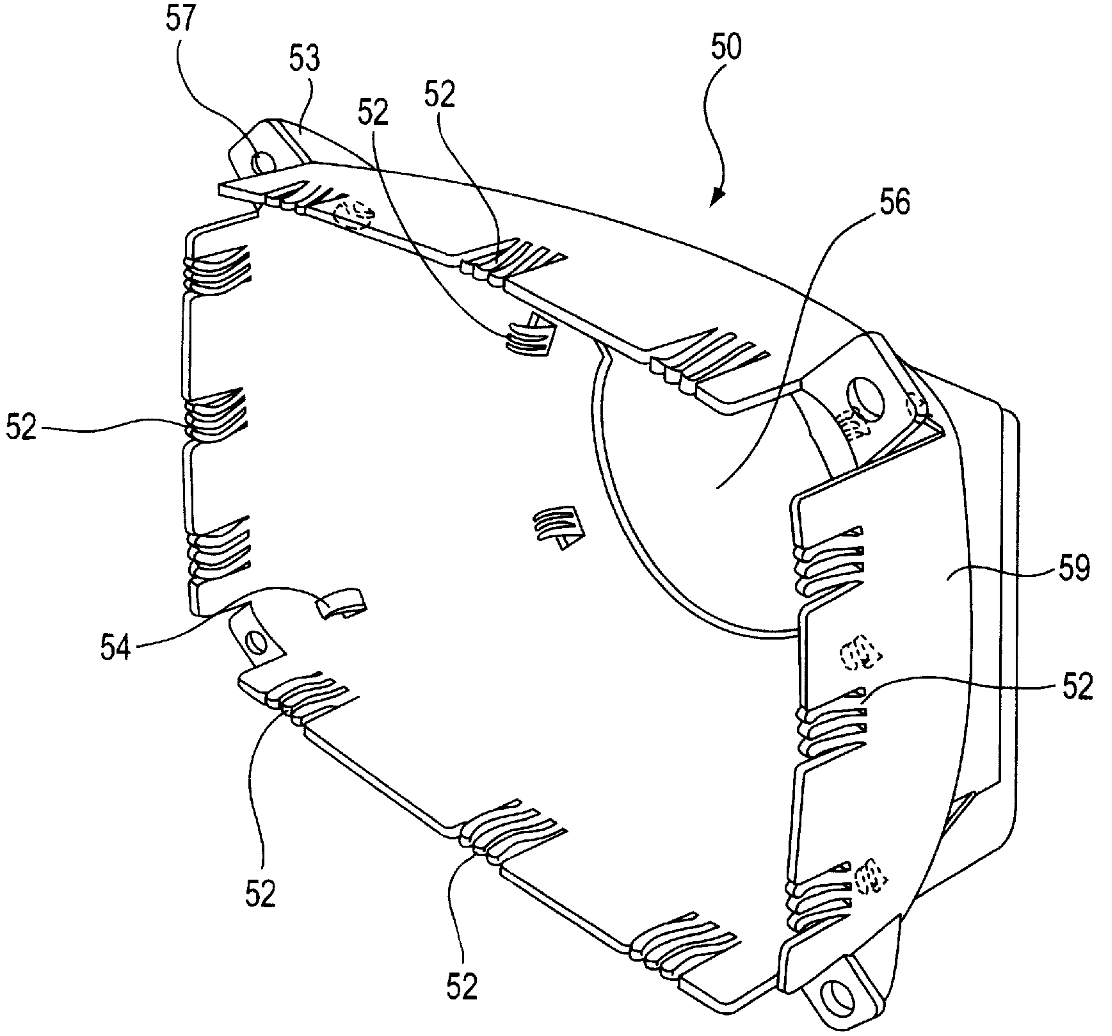
FIG. 3 is a perspective view of an electromagnetic wave shield for monitors as constructed in accordance with the principles of the present invention.

FIGS. 3 to 6 show an electromagnetic wave shield for monitors as constructed in accordance with the principles of the present invention. FIG. 3 shows outside ground terminals 52 for grounding cathode ray tube 30. The terminals are integrally formed on the front edge of shield 50. To form each of ground terminals 52, the front edge of shield 50 is axially slitted at a predetermined position thus forming a plurality of spaced elastic arms. The elastic arms of each ground terminal 52 are bent inward at their center positions so that terminals 52 are brought into close contact with band 32 of cathode ray tube 30 without being unexpectedly separated from band 32. Shield 50 also has a plurality of inside ground terminals 52 that come into close contact with funnel 34 of the cathode ray tube 30 thus grounding funnel 34.

Figure 4:
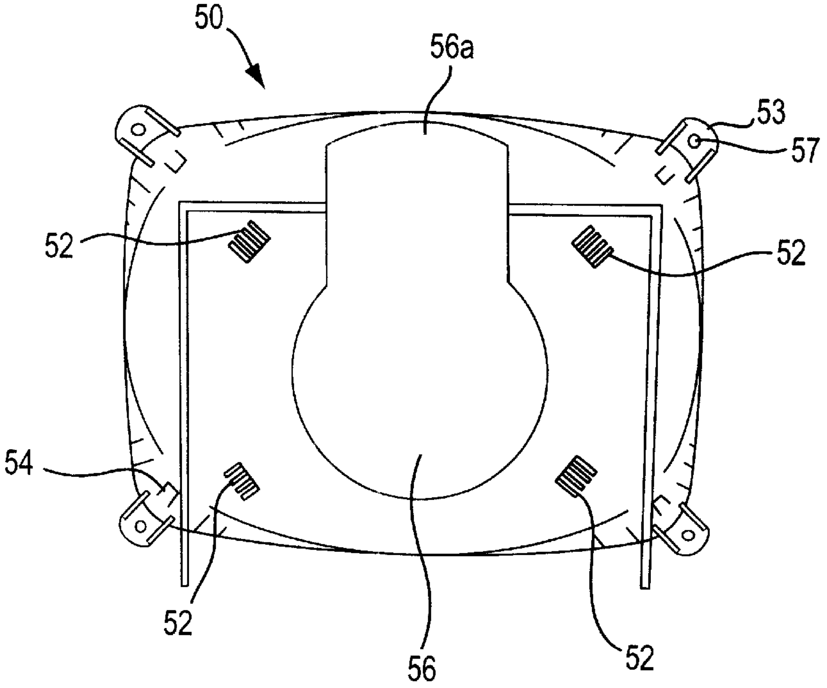
FIG. 4 is a rear view of the shield of FIG. 3.

Coil fixing member 54 for fixing degaussing coil 17 to the shield 50 is integrally formed on the inner surface of shield 50. As best seen in FIG. 4, the rear wall of shield 50 has circular opening 56 through which the cathode ray tube's necked portion, that contains electron gun 31, passes. The upper part of opening 56 is cut out to form a high voltage wire inlet opening 56*a*, that allows both a deflection coil (not shown) and a high voltage wire (not shown) to pass through prior to being connected to cathode ray tube 30. Integrally provided on each front corner of shield 50 is ear connector 53. Ear connectors 53 of shield 50 each have a fastener hole 57 to allow mounting ears 33 of cathode ray tube 30 to be fastened to front cover 40 of monitor. The fasteners used can be any combination of screws, bolts, and rivets.

Figure 6:
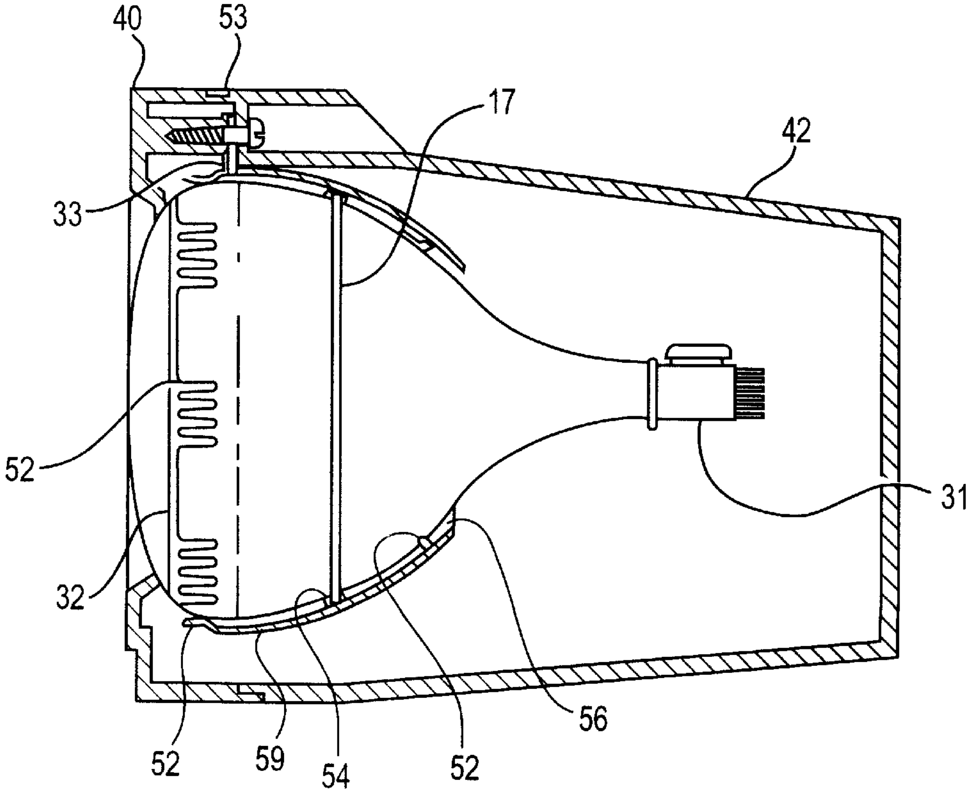
FIG. 6 is a side cross-sectional view of a monitor with the shield of FIG. 3.
Figure 5:
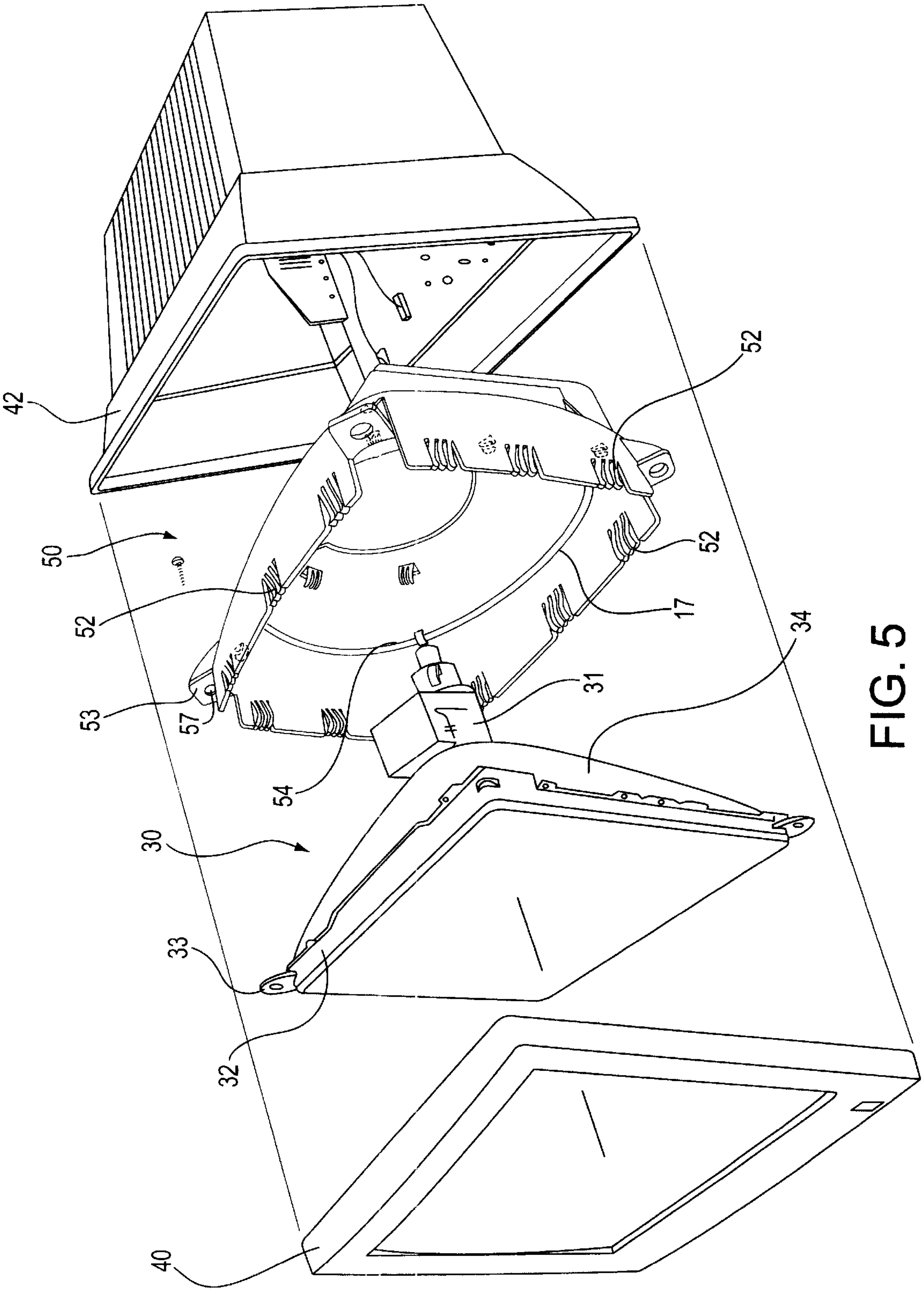
FIG. 5 is an exploded perspective view of a monitor with the shield of FIG. 3.

FIG. 6 is a side sectional view of the monitor with shield 50 as constructed according to the principles of the present invention. The mounting ears 33 are blades projecting outward from a cathode ray tube 30 where the blade has a hollow capable of accommodating a fastener. Ear connectors 53 of shield 50 are screwed to front cover 40 with each one of mounting ears 33 of cathode ray tube 30 being interposed between each one of ear connectors 53 front cover 40. This brings inside ground terminals 52 of shield 50 into elastic contact with the cathode ray tube's funnel 34, while outside ground terminals 52 come into elastic contact with the cathode ray tube's band 32. The outside ground terminals 52 are made of discrete flexible fingers that make a comb-like segment. Degaussing coil 17 is fixed to shield 50 by coil fixing member 54. Rear cover 42 is fastened to front cover 40 to form a single monitor casing. In the monitor casing, the cathode ray tube's funnel 34 is covered with wave shield part 59 of shield 50, while the cathode ray tube's neck part is held on rear opening 56 of shield 50 with the cathode ray tube's electron gun 31 being stably positioned at the outside of rear opening 56.

In the preferred embodiment of this invention, conductive shield 50 is integrally formed of conductive resin through an injection molding process in place of the typical pressing process. However, it should be understood that the conductive shield of this invention may be formed of typical nonconductive resin through an injection molding process prior to coating or spraying a conductive material onto the nonconductive shield. The conductive material may be applied onto the surface of the nonconductive shield through a plating process. When the conductive shield is formed by coating, spraying or plating a conductive material onto the surface of a nonconductive shield, it is possible to selectively apply the conductive material onto a part of the nonconductive shield except for insulating parts. In this case, it is not necessary to separately apply an insulating material onto the insulating parts of shield 50 to simplify the production process of conductive shield 50 while conserving the insulating material.

As described above, the present invention provides an electromagnetic wave shield for monitors. The shield of this invention is formed of a plastic material into a single structure through an injection molding process so that it is easily produced with improved manufacturing productivity. The plastic shield is also free from any sharpened edges to avoid causing any damage or injury to the covering tape of a degaussing coil or to the body of a worker while the shield is attached to a monitor. In the plastic shield of this invention, a plurality of elastic ground terminals are integrally formed on the shield through the injection molding process. The terminals are thus brought into elastic contact with the cathode ray tube's band and funnel without being unexpectedly separated from them. The integrated plastic shield also almost completely and uniformly shields the electromagnetic waves of the cathode ray tube regardless of positions of the shield. The plastic shield of this invention does not generate any irritating operational noise different from typical metal shields, when the monitor is turned on. Another advantage of the shield of this invention resides in that it is integrally formed of a single material thus being easily recycled.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. For example, the word "fastener" as used in both the specifications and the claims should be interpreted as meaning, any one or combination of a bolt, a screw, a snap, and a rivet. It is also possible that other benefits or uses of the currently disclosed invention will become apparent over time.

What is claimed is:

1. A monitor with a shield for blocking a plurality of electromagnetic waves, said monitor comprising:

a front cover;

a rear cover being engaged with said front cover to form a housing of said monitor, the housing accommodating insertion of a cathode ray tube having a first surface conveying varying visual images to a user, a second surface being opposite to the first surface and formed with a taper, a band portion corresponding to a perimeter of the first surface, and a funnel portion corresponding to a perimeter of the second surface;

said shield being mounted in the housing and positioned to block the electromagnetic waves generated by the cathode ray tube, said shield positioned to cover the funnel portion of the cathode ray tube;

a plurality of ear mounts being formed on said shield to accommodate each of a plurality of ears positioned on the cathode ray tube to fastenably attach to both said front cover and to said shield, said shield being fastenably secured to said front cover by inserting a fastener through a bore in said ear mounts, through a hollow in the ears, and into a recess in said front cover of said monitor;

multiple spaced-apart arrays each being composed of a plurality of discrete flexed fingers integrally formed from said shield, and each disposed to form a grounding contact between said shield and the cathode ray tube, said arrays positioned to contact both the band portion and the funnel portion of the cathode ray tube; and said shield forming an orifice allowing a high voltage wire to pass through said shield accommodating a connection to an anode of the cathode ray tube.

2. The monitor of claim 1, with each one of said ear mounts comprising a flange projecting outward from said shield, said flange having a bore capable of accommodating the fastener.

3. The monitor of claim 2, with the plurality of ear mounts being formed on said shield accommodating each one of the ears of the cathode ray tube comprising a blade projecting outward from the cathode ray tube in a direction parallel to the plane of the first surface of the cathode ray tube, the blade having the hollow accommodating the fastener.

4. The monitor of claim 3, with said shield further comprising four ear mounts each positioned in different corners of said shield.

5. The monitor of claim 3, further comprising a latching member integrated with an internal surface of said shield to secure a degaussing coil.

6. The monitor of claim 5, with said shield corresponding in shape to a hollow box having a hollow frustum of a cone attached on one side of the hollow box, the hollow frustum of the cone having a radius that reduces as a distance from the hollow box increases, the hollow box of said shield accommodating the band portion of the cathode ray tube, and the hollow frustum of the cone of said shield accommodating the funnel portion of the cathode ray tube.

7. The monitor of claim 6, further comprising said arrays being located on each side of the hollow box of said shield and being located along an inner surface of the hollow frustum of the cone of said shield, each of said arrays having said fingers forming a comb-like segment.

8. A shield, comprising:

a single body being integrally formed as a unitary piece accommodating insertion of a screen and funnel of a cathode ray tube while exposing said screen, being comprised of an electrically conductive resin, and having multiple spaced-apart arrays each composed of a plurality of discrete flexed fingers that form a plurality of spaced-apart grounding contacts with one of said arrays disposed around a periphery of said shield and all of said arrays disposed to simultaneously provide said grounding contacts with both a band portion and the funnel portion of the cathode ray tube.

9. The shield of claim 8, further comprising:

a plurality of ear mounts being formed on said shield to accommodate each of a plurality of ears positioned on the cathode ray tube to fastenably attach to both a front cover of a monitor and said shield, said shield positioned to being fastenably secured to the front cover by accommodating an insertion of a fastener through a bore in said ear mounts, through a hollow in the ears, and into a recess in the front cover of the monitor;

said shield positioned to cover the funnel portion of the cathode ray tube;

said multiple spaced-apart arrays integrally formed with said shield and positioned to contact both the band portion and the funnel portion of the cathode ray tube; and a perforation in said shield allowing a high voltage wire to pass through said shield accommodating a connection to an anode of the cathode ray tube.

10. The shield of claim 9, with each one of said ear mounts comprising a flange projecting outward from said shield, said flange having the bore accommodating the fastener.

11. The shield of claim 10, with the plurality of ear mounts being formed on said shield accommodating each one of the ears of the cathode ray tube comprising a blade projecting outward from the cathode ray tube in the direction parallel to the plane of the face of the monitor, the blade having the hollow accommodating the fastener.

12. The shield of claim 11, with said shield further comprising four ear mounts each positioned in different corners of said shield.

13. The shield of claim 11, further comprising a latching member integrated with an internal surface of said shield body to secure a degaussing coil.

14. The shield of claim 13, with said shield corresponding in shape to a hollow rectangular box having a hollow frustum of a cone attached on one side of the hollow rectangular box, the hollow frustum of a cone having a radius that reduces as a distance from the hollow rectangular box increases, the hollow rectangular box of said shield accommodating said band portion of the cathode ray tube, and the hollow frustum of the cone of said shield accommodating said funnel portion of the cathode ray tube.

15. The shield of claim 14, further comprising said arrays being located on each side of the hollow rectangular box portion of said shield and being located along an inner surface of the hollow frustum of the cone of said shield, each of said arrays being composed of a plurality of fingers forming a comb-like segment.

16. A shield for blocking a plurality of electromagnetic waves and usable with a monitor, said shield comprising:

a single body integrally formed as a unitary piece, said single body composed of a non-conductive resin using a molding process, said body having multiple spaced-apart arrays that are each comprised of a plurality of discrete flexed fingers integrally formed from said shield, and each disposed to form a grounding contact between said shield and a cathode ray tube, said single body accommodating a fastenable attachment with the cathode ray tube; and a conductive material being applied onto the surface of said single body through a coating or plating process.

17. The shield of claim 16, further comprising:

a plurality of ear mounts being formed on said shield accommodating each of a plurality of ears positioned on the cathode ray tube to fastenably attach to both a front cover of the monitor and said shield, said shield positioned to being fastenably secured to the front cover by accommodating insertion of a fastener through a bore in said ear mounts, through a hollow in the ears, and into a recess in the front cover of the monitor;

said shield positioned to cover the funnel portion of the cathode ray tube;

said arrays integrally formed with said shield and positioned to contact both the band portion and the funnel portion of the cathode ray tube; and a perforation in said shield allowing a high voltage wire to pass through said shield accommodating connection to an anode of the cathode ray tube.

18. The shield of claim 17, with each one of said ear mounts comprising a flange projecting outward from said shield, said flange having the bore accommodating the fastener.

19. The shield of claim 18, with the plurality of ear mounts being formed on said shield accommodating each one of the ears of the cathode ray tube comprising a blade projecting outward from the cathode ray tube in the direction parallel to said plane of the face of the monitor, the blade having the hollow accommodating the fastener.

20. The shield of claim 19, with said shield further comprising four ear mounts each positioned in different corners of said shield.

21. The shield of claim 19, further comprising a latching member integrated with an internal surface of said shield body to secure a degaussing coil.

22. The shield of claim 21, with said shield corresponding in shape to a hollow rectangular box having a hollow frustum of a cone attached on one side of the hollow rectangular box, the hollow frustum of a cone having a radius that reduces as a distance from the hollow rectangular box increases, the hollow rectangular box of said shield accommodating the band portion of the cathode ray tube, and the hollow frustum of the cone of said shield accommodating the funnel portion of the cathode ray tube.

23. The shield of claim 22, further comprising said arrays being located on each side of the hollow rectangular box portion of said shield and being located along an inner surface of the hollow frustum of a cone portion of said shield, each of said arrays being composed of a plurality of fingers forming a comb-like segment.

* * * * *